Figure 1:
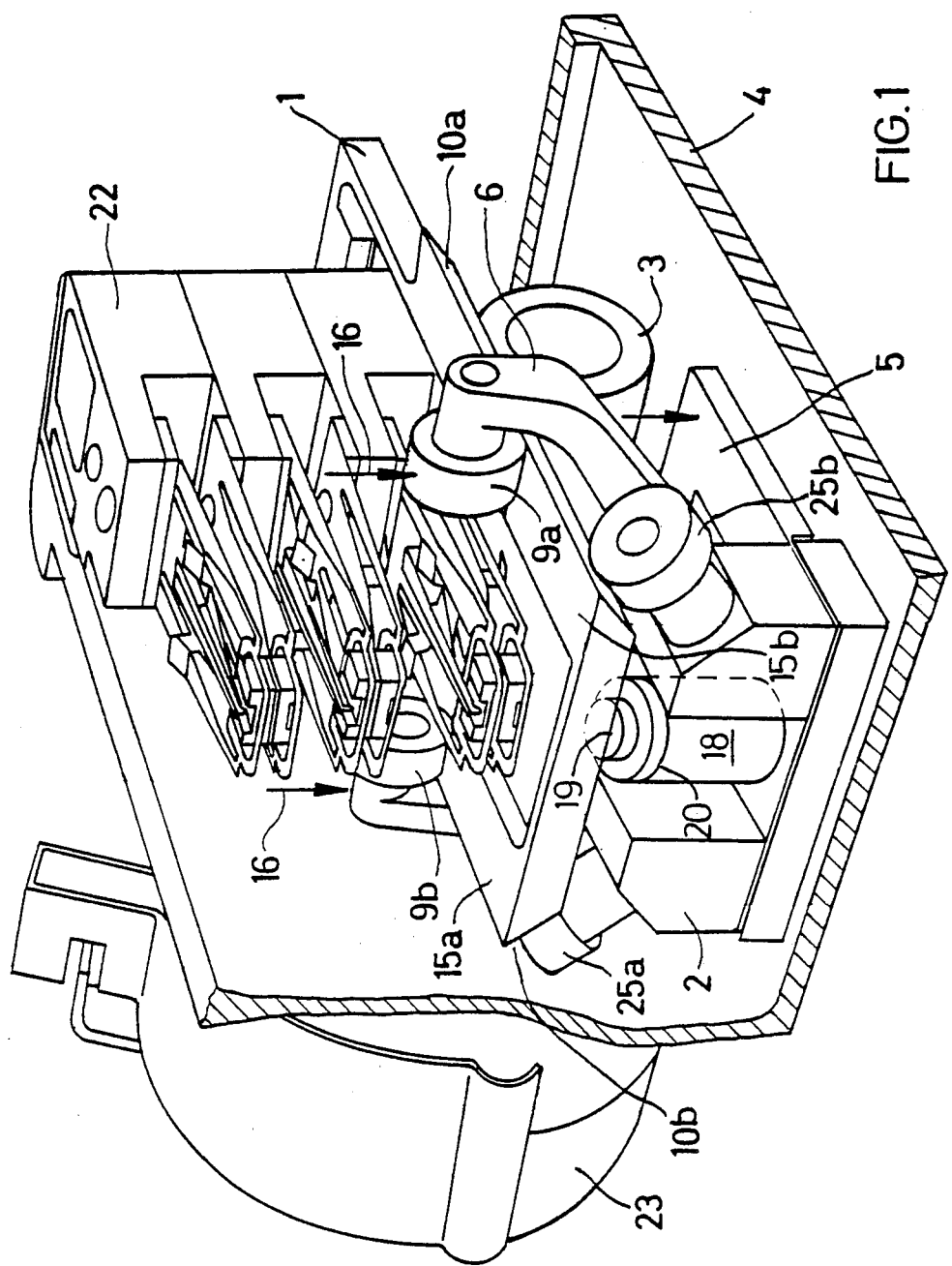

United States Patent [19]

Manzke et al.

[11] Patent Number: 4,660,120
[45] Date of Patent: Apr. 21, 1987

[54] DISK DRIVE UNIT COMPRISING A HEAD POSITIONING DEVICE AND ELECTROMAGNETIC RELEASING/ARRESTING MEANS THEREFOR

[75] Inventors: Klaus Manzke, Westheim; Hans-Joachim Weis, Mannheim; Gerhard Soehring, Weinheim, all of Fed. Rep. of Germany

[73] Assignee: BASF Aktiengesellschaft, Ludwigshafen, Fed. Rep. of Germany

[21] Appl. No.: 604,390

[22] Filed: Apr. 27, 1984

[30] Foreign Application Priority Data

Apr. 29, 1983 [DE] Fed. Rep. of Germany ... 8312653[U]

[51] Int. Cl.⁴ .......................... G11B 5/54; H01F 7/08; H01F 3/00
[52] U.S. Cl. .................................... 360/137; 335/255; 360/105
[58] Field of Search .................... 360/105, 106, 97–99, 360/86, 75, 137; 335/253, 255, 220, 251

[56] References Cited

U.S. PATENT DOCUMENTS 3,890,587  6/1975  Field .................................... 335/255
4,139,874  2/1979  Shiraishi ........................ 360/105 X
4,475,136  10/1984 Manzke et al. ..................... 360/106
4,484,241  11/1984 Brende et al. ....................... 360/105
4,490,758  12/1984 Hoshi .................................. 360/105

FOREIGN PATENT DOCUMENTS 0123011  9/1979  Japan .................................... 360/105
0748540  7/1980  U.S.S.R. .............................. 335/253

OTHER PUBLICATIONS

Bailey et al., "Read/Write Head Load-Unload Device", IBM TBC, Dec. 1975, vol. 18, No. 7, pp. 2246–2247.
Hauptkatalog Nr. 5, Hahn Magnet GmbH & Co. KG, S.17 Hub-Magnet TYP FL 20/A3.

Primary Examiner—John H. Wolff
Assistant Examiner—David J. Severin
Attorney, Agent, or Firm—Keil & Weinkauf

[57] ABSTRACT

A disk drive unit is provided with an electromagnetic releasing/arresting device for the head support, in order to prevent the head and the disk record from being damaged when the drive unit is shipped, handled or switched off. The novel electromagnet has a low power consumption and small dimensions, is economical to manufacture and exhibits high operational reliability.

12 Claims, 4 Drawing Figures

DISK DRIVE UNIT COMPRISING A HEAD POSITIONING DEVICE AND ELECTROMAGNETIC RELEASING/ARRESTING MEANS THEREFOR

The present invention relates to a disk drive unit comprising a positioning device which includes a scanning-head support that can be displaced relative to at least one disk record, and to electromagnetic releasing-/arresting means for the head support.

Disk drives, such as record players, video disk recording and/or playback apparatus and processing units for data recording disks, employing mechanical, optical, electrical or magnetic write/read heads, are known.

In the case of these drives, where the support means for the head is movable relative to the disk record, there is always a risk of the head and/or the disk being physically damaged as a result of their making undesirable contact with one another.

An object of the invention is to provide means which effectively prevent such head and/or disk damage.

We have found that this object is achieved if an electromagnet serving as an electrically controlled releasing/arresting device is associated with the head support means.

Controllability is necessary in order to ensure that the head support is immobilized if there is a power failure for instance.

In an advantageous, inexpensive embodiment of the invention, the electromagnetic arresting/releasing device cooperating with the head support means comprises a preferably cylindrical exciting coil and a spring-loaded armature which is provided with a latch or friction pad.

The electromagnetic device of the invention can of course also be used with advantage for all applications where rapid, short-stroke displacements and a low power consumption are required.

In a particularly advantageous embodiment of the novel electromagnetic device, a cylindrical exciting coil is arranged in a casing, and the armature comprises a disk-shaped member to which a spring-loaded plunger is attached, said member being parallel to the respective end faces of the coil and the casing.

As a result of this design, great compactness and a relatively powerful pull are achieved, the working air-gap being advantageously located only between the respective outer annular regions of the casing and the disk-shaped armature, in order to keep reluctance to a minimum. Moreover, the novel electromagnet can be manufactured economically and exhibits high operational reliability.

In a further advantageous embodiment, the plunger consists of a thin portion and a thick portion which is adjacent to the armature and is located at least partially in the magnetic field produced by the coil. As a result of this design, guidance of the plunger is improved, the magnetic flux passing via the plunger is optimally utilized to exert pull on the armature, and the plunger mass is kept to a minimum. The casing is provided with two interconnecting coaxial bores, one to accommodate the thick portion of the plunger, and the other to accommodate the thin portion of said plunger. A compression spring which fits over the thin portion of the plunger is located in the large bore in the casing.

As stated above, a latch or friction pad is advantageously arranged directly on the armature.

The electromagnetic device of the invention has a ratio of pull to volume of at least 300 mN/cm$^3$, particularly more than 500 nM/cm$^3$. This ratio is two to four times higher than that of prior art electromagnets, so that much better use can be made of the space available inside compact apparatus such as fixed disk drives and printers.

Figure 2:
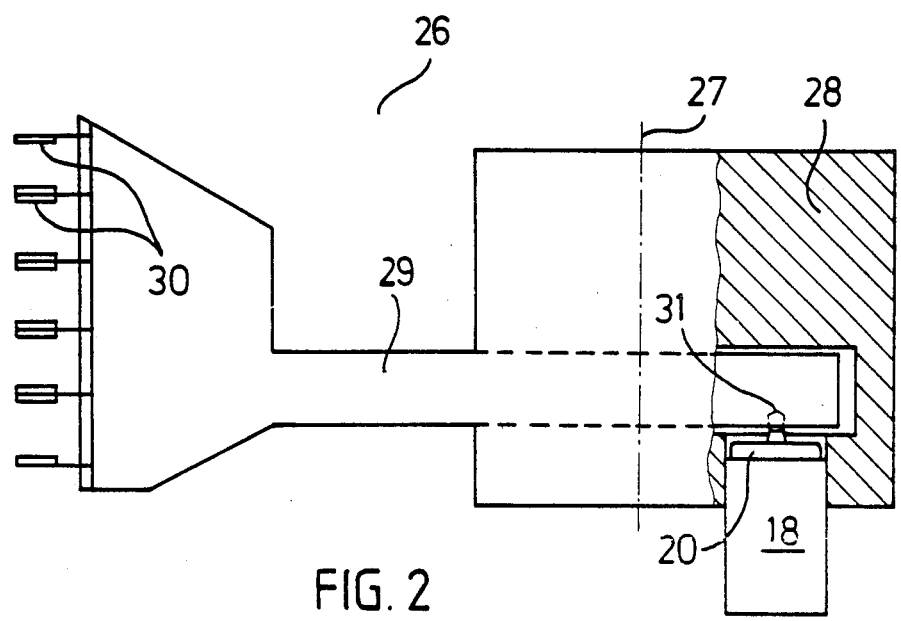
Figure 3A:
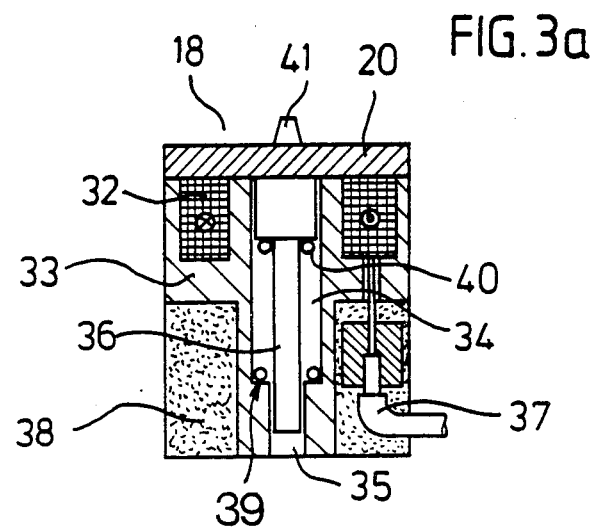
Figure 3B:
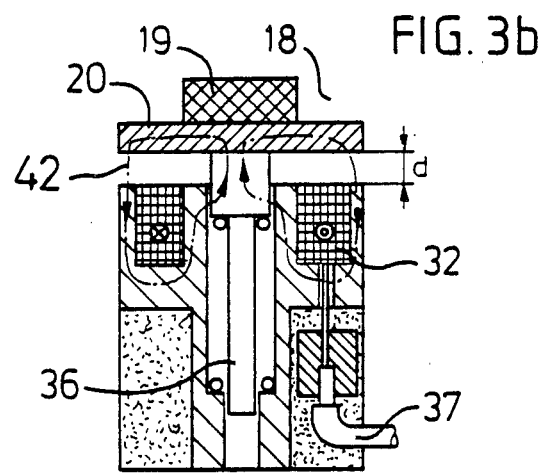

Further details of the invention are disclosed in the following embodiments given by way of example and illustrated in the accompanying drawings, in which FIG. 1 is a schematic perspective view of a linear head positioning device, comprising a drive motor, for a magnetic disk drive, with the chassis of the drive unit in section, which shows the electromagnetic releasing-/arresting device according to the invention, FIG. 2 is a schematic side view of a rotary head positioner for a magnetic disk drive, showing the electromagnetic releasing/arresting device according to the invention, and FIGS. 3a and 3b are respectively cross-sectional side views of the novel electromagnetic releasing/arresting device in the energized and the non-energized state.

Referring first to FIG. 1, a motor 23, which is fastened to the chassis 4 of the disk drive unit, carries on its shaft a cylindrical member 3 which is firmly held in position by means of a clamping element, and around which a drive band is wound, the two ends of this band being securely attached to the carriage 1 bearing the magnetic head assembly 22. No spring means of any kind is required for tensioning the drive band, which is inextensible in the longitudinal direction, because the presence thereof would make positioning less accurate. The carriage 1 is supported, at one end, on the periphery of the cylindrical member 3 and, at the other end, by means of anti-friction bearings 25a, 25b on bearing carriers 2 which, in their turn, are rigidly attached to the chassis 4.

A bow-shaped member 6 is arranged centrally between the cylindrical member 3 and the bearing carriers 2, and presses, via anti-friction bearings 9a, 9b, on the upper guide surfaces 15a, 15b of the carriage 1. The forces applied to either side of the carriage 1, in the direction 16, are produced by means of a prestressed flexure member 5, via which the bow-shaped member 6 is attached to the chassis 4.

The lateral guide surfaces 10a and 10b of the carriage 1, which are preferably inclined, are supported on anti-friction bearings 25a and 25b on bearing carriers 2, and the position of the carriage 1 in the chassis 4 is determined by this bearing arrangement.

The arrangement of the above-described pairs of anti-friction bearings, which can in practice be ball bearings, can also, in principle, be reversed, with the fixed bearings on top, and the gimbal-mounted bearings underneath, or the order in which the guide elements are arranged in the direction in which the carriage moves can be reversed.

Due to the manner in which the anti-friction bearings 9a, 9b, 25a, 25b are arranged relative to the guide surfaces 15a, 15b, 10a, 10b, linear contact between the bearings and the carriage is achieved, as a result of which a considerable reduction in the contact pressure and hence a low-wear guide system are obtained.

A controllable electromagnetic releasing/arresting device 18 is arranged between the bearing carriers 2; it is of course possible to locate the device at some other point beneath the carriage, with the proviso that it does not interfere with the drive mechanism. The control circuit for the device 18 can be of any conventional design and is therefore not described herein. Device 18 includes a friction pad 19 which is fastened to a disk-shaped armature 20, and bears against the underside of carriage 1 when the device is non-energized. Since drive motor 23 is a stepping motor, which is usually controlled by pulses, it is essential that the carriage 1 bearing the head assembly 22 should be stopped immediately in the position it is momentarily occupying when there is a power failure or the disk drive unit is switched off.

When the disk drive unit is in operation, the electromagnetic device 18 is energized, with the result that the armature 20 is pulled down and held against the end face of the casing 33 (cf. FIG. 3a) by the magnetic field produced. As shown in FIG. 3b, when the drive unit is switched off or there is a power failure, the armature 20 is released, and the compression spring 40 presses the friction pad 19 on armature 20 against the carriage 1 and thus stops it in its momentary position.

A rotary positioner 26 comprising a pivot 27, a drive motor 28, a swinging arm 29 and a plurality of magnetic heads 30 is shown schematically in FIG. 2.

An electromagnetic releasing/arresting device 18 is located beneath the rear driven end of the swinging arm 29 in which there is a hole 31 for receiving a matching projection 41 on the armature 20 of the electromagnetic device. When the disk drive unit is switched off or there is a power failure, the rear end of the swinging arm 29 is drawn by the still remaining magnetic field, produced by the D.C. drive motor, into the locking position in which projection 41 is pressed into hole 31 by spring 40. It is of course also possible to use a friction pad as shown in FIG. 1 to arrest the swinging arm, but a positive connection has proved to be more suitable because only very slight pressure is continuously exerted on the bearings of the swinging arm.

FIGS. 3a and 3b show the construction of the novel electromagnetic releasing/arresting device in detail, the energized state being shown in FIG. 3a, and the non-energized state or the state immediately after the commencement of current flow being shown in FIG. 3b. The cylindrical coil 32 serving as exciting coil is accommodated in a casing 33, below the armature 20. The casing 33 is provided with two interconnecting coaxial bores 34 and 35 in which the plunger 36 is guided longitudinally. Plunger 36 consists of a long portion of small diameter and a short portion of large diameter, the latter being fastened to the armature 20. The bore 34 acts as a guide for the portion of large diameter, and the bore 35 as a guide for the portion of small diameter. Leads 37 are encapsulated in a suitable insulating material 38. A compression spring 40, which can be readily slipped over the thin plunger portion, is located inside the large bore 35, its upper end bearing against the lower annular surface of the thick plunger portion, and its lower end against the annular shoulder 39 formed at the point where bores 34 and 35 meet. Spring 40 is shown in the compressed state in FIG. 3a and released in FIG. 3b; in the latter case, plunger 26 bearing the armature 20 is urged upwards through stroke d.

As shown in FIG. 3b, after the drive unit has been switched on, or current starts to flow again following a power failure, the lines of force 42 pass essentially only through the outer annular portion of the working air-gap, reluctance thus being kept to a minimum. The annular gap between the thick plunger portion and the wall of the bore 34 is very small on account the latter's guiding function, so that this gap can be disregarded as a working air-gap. A completely closed magnetic circuit is formed when armature 20 is drawn up against the end face of casing 33 (cf. FIG. 3a). Owing to its special design, electromagnet 18 has low power requirements and yet is very powerful. The ratio of its pull (P) to its volume (V) (P/V ratio) is surprisingly high, namely at least 30 pond/cm$^3$ ($\sim$300 mN/cm$^3$), particularly more than 50 pond/cm$^3$ ($\sim$500 mN/cm$^3$).

An electromagnet of the above-described type, having an exciting coil with 175 turns and a resistance of 6 ohms, has a length of 18.5 mm, including the armature 20, and a diameter of 13 mm. The starting current of this electromagnet is $\sim$1.5 A/50 msec, and its power consumption is only $\sim$1 W in continuous operation. The stroke d is 1 mm, the spring rate being 180 pond (1.8N).

By contrast, a commercial electromagnet (cf. Catalog No. 5/1970, page 17, Electromagnet GL 20/A3, of Neue Hahn-Magnet GmbH & Co. KG, 7791 Engelwies-Messkirch, Germany) has the following characteristic data:
Length: 37 mm
Diameter: 20 mm
Pull: 150 pond (1.5N)
Stroke: 3 mm
Power consumption: 4 W.

The P/V ratio of this magnet is 13 pond/cm$^3$ (130 mN/cm$^3$) and is thus more than twice as low as the lowest P/V ratio of the novel electromagnetic device whose power consumption is moreover one-quarter of that of the said commercial magnet.

To our knowledge electromagnets smaller than the afore-mentioned one are not commercially available.

The electromagnetic device according to the present invention having the above characteristics has a P/V ratio of 76 pond/cm$^3$ (760 mN/cm$^3$), which is almost 6 times higher than the P/V ratio of the commercial magnet.

Although the novel electromagnetic device has been particularly described in conjunction with a head positioner for a magnetic disk drive, it can, on account of its favorable characteristics, particularly its high P/V ratio, be used with advantage in all types of compact apparatus, such as typewriters, printers, control equipment, record players and cassette recorders, where linear displacements have to be effected in the smallest possible space. Rectilinear, arcuate or circular movements can be easily controlled, in particular initiated or stopped, even though braking and locking applications only have been described above. For example, a rotating roller or the outside or inside rotor of an electric motor can be braked with the electromagnetic device of the invention. Theoretically, such an electromagnet could be used to directly raise a scanning head from, and directly lower it onto, a disk record through a distance of, for example, 1 mm, i.e. the stroke d of the above-described novel magnet.

What is claimed is:

1. An information storage apparatus having at least one information storage disk, a positioning device and a scanning head(s) carried thereby, said positioning device being supported for movement relatively to said information storage disk(s), and said apparatus having an electrically controllable locking means for the protection of the positioning device and the storage head(s), said locking means having an electromagnetic device including an armature and, in a casing, an energizing coil and a restoring spring bearing against the armature, wherein the armature comprises a plunger guided for longitudinal movement in the casing and an armature plate mounted on said plunger, wherein said energizing coil is provided at one end of the casing and the armature plate is parallel to the front face of the energizing coil so that the effective working air gap extends substantially between the armature plate, which serves as the return path for the magnetic flux, and the front face of the energizing coil, and wherein the armature, the energizing coil and the casing are dimensioned so that the electromagnetic device has a pull/volume ratio M/V of at least 300 mN/cm$^3$.

2. An information storage apparatus as claimed in claim 1, wherein the electromagnetic device has a pull/volume ratio M/V greater than 500 mN/cm$^3$.

3. An information storage apparatus as claimed in claim 1, wherein the positioning device has a hole, and wherein a locking pin is provided at the armature plate, said pin, in the locking condition, engaging said hole in the positioning device.

4. An information storage apparatus as claimed in claim 1, wherein a friction pad is provided at the armature plate.

5. An information storage apparatus as claimed in claim 1, wherein the plunger of the electromagnetic device has a first portion with a first diameter and, adjacent its junction with the armature plate, a second portion with a second, larger diameter, said second portion at least partially being located within the magnetic field of the coil.

6. An information storage apparatus as claimed in claim 1, wherein the casing has one bore with a diameter approximately corresponding to that of the larger plunger portion and another for the plunger with a diameter approximately corresponding to said smaller diameter.

7. An information storage apparatus as claimed in claim 6, wherein the restoring spring is a compression spring and wherein said compression spring is provided in the larger bore of the casing.

8. An electromagnetic device with a fast operating time and a short stroke, particularly for use as an electrically controllable locking means for the protection of the positioning device and the scanning head(s) carried thereby, in an information storage apparatus, said positioning device being supported for movement relatively to at least one information storage disk, said electromagnetic device including an armature and, in a casing, an energizing coil and a restoring spring bearing against the armature, wherein the armature comprises a plunger guided for longitudinal movement in the casing and an armature plate mounted on said plunger, wherein said energizing coil is provided at one end of the casing and the armature plate is parallel to the front face of the energizing coil so that the effective working air gap extends substantially between the armature plate, which serves as the return path for the magnetic flux, and the front face of the energizing coil, and wherein the armature, the energizing coil and the casing are dimensioned so that the electromagnetic device has a pull/volume ratio M/V of at least 300 mN/cm$^3$.

9. An electromagnetic device as claimed in claim 8, wherein said electromagnetic device has a pull/volume ratio M/V of more than 500 mN/cm$^3$, preferably of 760 mN/cm$^3$.

10. An electromagnetic device as claimed in claim 8, wherein the free face of the armature plate carries a locking pin.

11. An electromagnetic device as claimed in claim 8, wherein the free face of the armature plate carries a friction pad.

12. An electromagnetic device with a fast operating time and a short stroke, particularly for use in information storage apparatus, said electromagnetic device including an armature and, in a casing, an energizing coil and a restoring spring bearing against the armature, wherein the armature comprises a plunger guided for longitudinal movement in the casing and an armature plate mounted on said plunger, wherein said energizing coil is provided at one end of the casing and the armature plate is parallel to the front face of the energizing coil so that the effective working air gap extends substantially between the armature plate, which serves as the return path for the magnetic flux, and the front face of the energizing coil, and wherein the armature, the energizing coil and the casing are dimensioned so that the electromagnetic device has a pull/volume ratio M/V of at least 300 mN/cm$^3$.

* * * * *